(12) United States Patent
Ripa

(10) Patent No.: US 11,343,305 B2
(45) Date of Patent: May 24, 2022

(54) SYSTEMS AND METHODS OF AUTOMATING A FILE DOWNLOAD ACTIVITY

(71) Applicant: UiPath Inc., New York, NY (US)

(72) Inventor: Bogdan Ripa, Buchare (RO)

(73) Assignee: UiPath Inc., New York, NY (US)

( * ) Notice: Subject to any disclaimer, the term of this patent is extended or adjusted under 35 U.S.C. 154(b) by 171 days.

(21) Appl. No.: 17/008,955

(22) Filed: Sep. 1, 2020

(65) Prior Publication Data

US 2022/0070246 A1    Mar. 3, 2022

(51) Int. Cl.
*H04L 29/08*      (2006.01)
*G06F 9/48*       (2006.01)
*G06F 16/17*      (2019.01)
*H04L 67/06*      (2022.01)
*H04L 67/00*      (2022.01)

(52) U.S. Cl.
CPC .............. *H04L 67/06* (2013.01); *G06F 9/485* (2013.01); *G06F 16/1734* (2019.01); *H04L 67/34* (2013.01)

(58) Field of Classification Search
CPC ......... H04L 67/06; H04L 67/34; G06F 9/485; G06F 16/1734
See application file for complete search history.

(56) References Cited

U.S. PATENT DOCUMENTS

| | | | |
|---|---|---|---|
| 6,449,723 B1 | 9/2002 | Elgressy et al. | |
| 6,708,189 B1* | 3/2004 | Fitzsimons | G06F 16/258 709/227 |
| 10,198,522 B1* | 2/2019 | Boyle | H04M 1/72403 |
| 10,587,772 B2 | 3/2020 | Webster et al. | |
| 10,657,258 B2 | 5/2020 | Harms et al. | |
| 10,908,950 B1* | 2/2021 | Dennis | G06F 9/4881 |
| 2018/0189093 A1* | 7/2018 | Agarwal | G06F 9/45558 |
| 2020/0004798 A1* | 1/2020 | Weinert, Jr. | G06F 16/9577 |
| 2022/0050584 A1* | 2/2022 | Dines | G06V 10/235 |

FOREIGN PATENT DOCUMENTS

| | | | | |
|---|---|---|---|---|
| CN | 107911467 A | | 4/2018 | |
| CN | 109636309 A | * | 4/2019 | ........... G06Q 10/103 |
| CN | 109636309 A | | 4/2019 | |
| CN | 110807001 A | | 2/2020 | |
| CN | 111124734 A | | 5/2020 | |
| EP | 3937034 A1 | * | 1/2022 | ......... G05B 19/0426 |
| JP | 3951226 B2 | | 8/2007 | |

* cited by examiner

*Primary Examiner* — Kostas J Katsikis
(74) *Attorney, Agent, or Firm* — Law Office of Andrei D Popovici, PC

(57) ABSTRACT

In some embodiments, a robotic process automation (RPA) design interface comprises a dedicated menu item which, when invoked, includes a file download activity into an existing robotic workflow. A configuration interface further enables the developer to set activity parameters such as a download trigger event and a destination folder for the downloaded file. In some embodiments, executing the download activity comprises the RPA robot suspending subsequent activities of the current robotic workflow until the respective download is complete, and automatically determining a set of runtime attribute values (e.g., filename, size, etc.) of the downloaded file.

20 Claims, 11 Drawing Sheets

SYSTEMS AND METHODS OF AUTOMATING A FILE DOWNLOAD ACTIVITY

BACKGROUND

The invention relates to robotic process automation (RPA), and in particular to facilitating the automation of file download activities.

RPA is an emerging field of information technology aimed at improving productivity by automating repetitive computing tasks, thus freeing human operators to perform more intellectually sophisticated and/or creative activities. Notable tasks targeted for automation include extracting structured data from documents and interacting with user interfaces, for instance to fill in forms, among others.

A distinct prong of RPA development is directed at simplifying the programming and management of software robots, with the ultimate goal of extending the reach of RPA technology to users that lack advanced programming skills or training. One way of making RPA more accessible is the development of RPA-oriented integrated development environments (IDEs) which allow the programming of robots via graphical user interface (GUI) tools, instead of coding per se. There is a strong interest in making such GUI tools as intuitive and user-friendly as possible, to attract a broad audience of developers.

SUMMARY

According to one aspect, a method comprises employing at least one hardware processor of a computer system to expose an activity menu to a user, the activity menu comprising a plurality of RPA activities available for execution by a software robot, the activity menu including a file download item. The method further comprises, in response to a user input selecting the file download item, inserting a file download activity into a workflow comprising an ordered sequence of RPA activities, the file download activity instructing a software robot to download a file to a destination folder. Executing the software robot on an RPA host causes the RPA host, in response to initiating a download of the file, to suspend execution of another activity of the workflow until the download is complete, the other activity following the file download activity within the workflow. When the download is complete, executing the software robot further causes the RPA host to resume execution of the other activity using a runtime value of a file attribute of the file.

According to another aspect, a computer system comprises at least one hardware processor configured to expose an activity menu to a user, the activity menu comprising a plurality of RPA activities available for execution by a software robot, the activity menu including a file download item. The at least one hardware processor is further configured, in response to a user input selecting the file download item, to insert a file download activity into a workflow comprising an ordered sequence of RPA activities, the file download activity instructing a software robot to download a file to a destination folder. Executing the software robot on an RPA host causes the RPA host, in response to initiating a download of the file, to suspend execution of another activity of the workflow until the download is complete, the other activity following the file download activity within the workflow. When the download is complete, executing the software robot further causes the RPA host to resume execution of the other activity using a runtime value of a file attribute of the file.

According to another aspect, a non-transitory computer-readable medium stores instructions which, when executed by at least one hardware processor of a computer system, cause the computer system to expose an activity menu to a user, the activity menu comprising a plurality of RPA activities available for execution by a software robot, the activity menu including a file download item. The instructions further cause the at least one hardware processor, in response to a user input selecting the file download item, to insert a file download activity into a workflow comprising an ordered sequence of RPA activities, the file download activity instructing a software robot to download a file to a destination folder. Executing the software robot on an RPA host causes the RPA host, in response to initiating a download of the file, to suspend execution of another activity of the workflow until the download is complete, the other activity following the file download activity within the workflow. When the download is complete, executing the software robot further causes the RPA host to resume execution of the other activity using a runtime value of a file attribute of the file.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
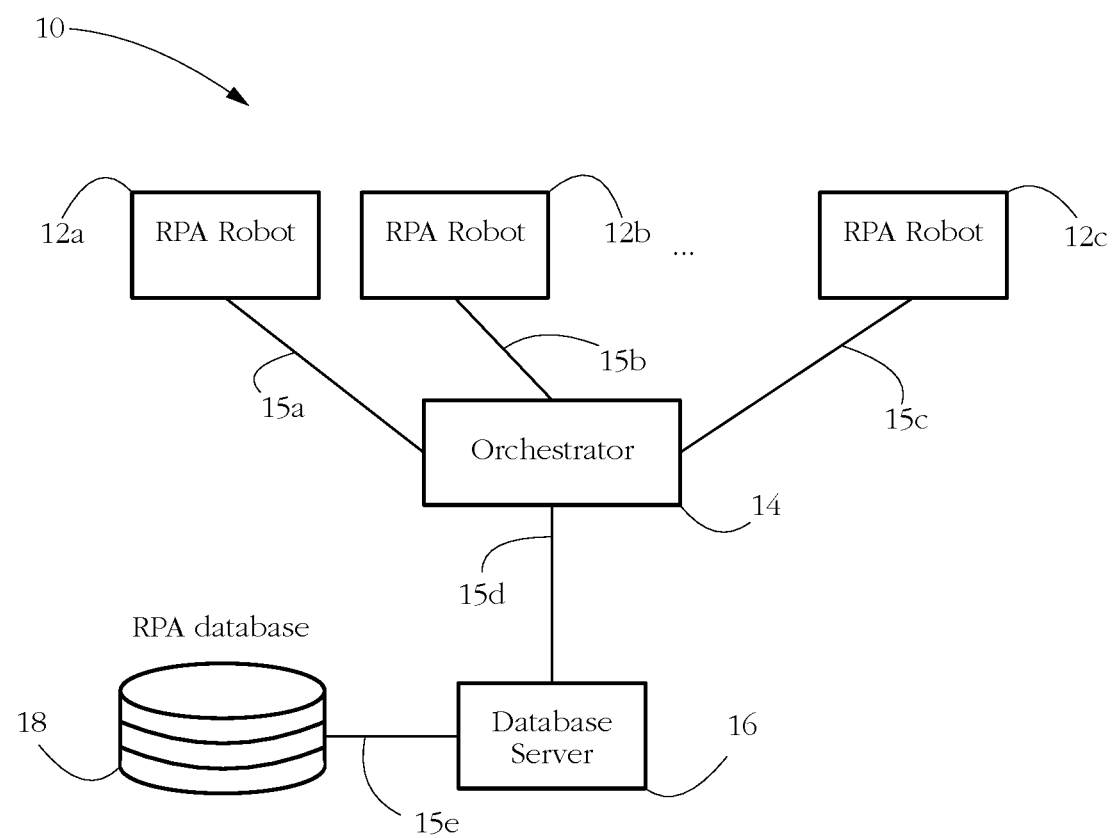
FIG. 1 shows an exemplary robotic process automation (RPA) environment according to some embodiments of the present invention.

FIG. 1 shows an exemplary robotic process automation (RPA) environment 10 according to some embodiments of the present invention. Environment 10 comprises various software components which collaborate to achieve the automation of a particular task. In an exemplary RPA scenario, an employee of a company uses a business application (e.g., word processor, spreadsheet editor, browser, email application) to perform a repetitive task, for instance to issue invoices to various clients. To actually carry out the respective task, the employee performs a sequence of operations/actions, which is herein deemed a process. Exemplary operations forming a part of an invoice-issuing process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of RPA environment 10 may automate the respective process by mimicking the set of operations performed by the respective human operator in the course of carrying out the respective task.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Processes typically targeted for such automation include processing of payments, invoicing, communicating with business clients (e.g., distribution of newsletters and/or product offerings), internal communication (e.g., memos, scheduling of meetings and/or tasks), auditing, and payroll processing, among others. In some embodiments, a dedicated RPA design application 30 (FIG. 2) enables a human developer to design a software robot to implement a workflow that effectively automates a target process. A workflow typically comprises a sequence of custom automation steps, herein deemed activities. Workflows may be nested and/or embedded. Each activity may include an action performed by the robot, such as clicking a button, reading a file, writing to a spreadsheet cell, etc. In some embodiments, RPA design application 30 exposes a user interface and set of tools that give the developer control of the execution order and the relationship between activities of a workflow. One commercial example of an embodiment of RPA design application 30 is UiPath StudioX™.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Figure 2:
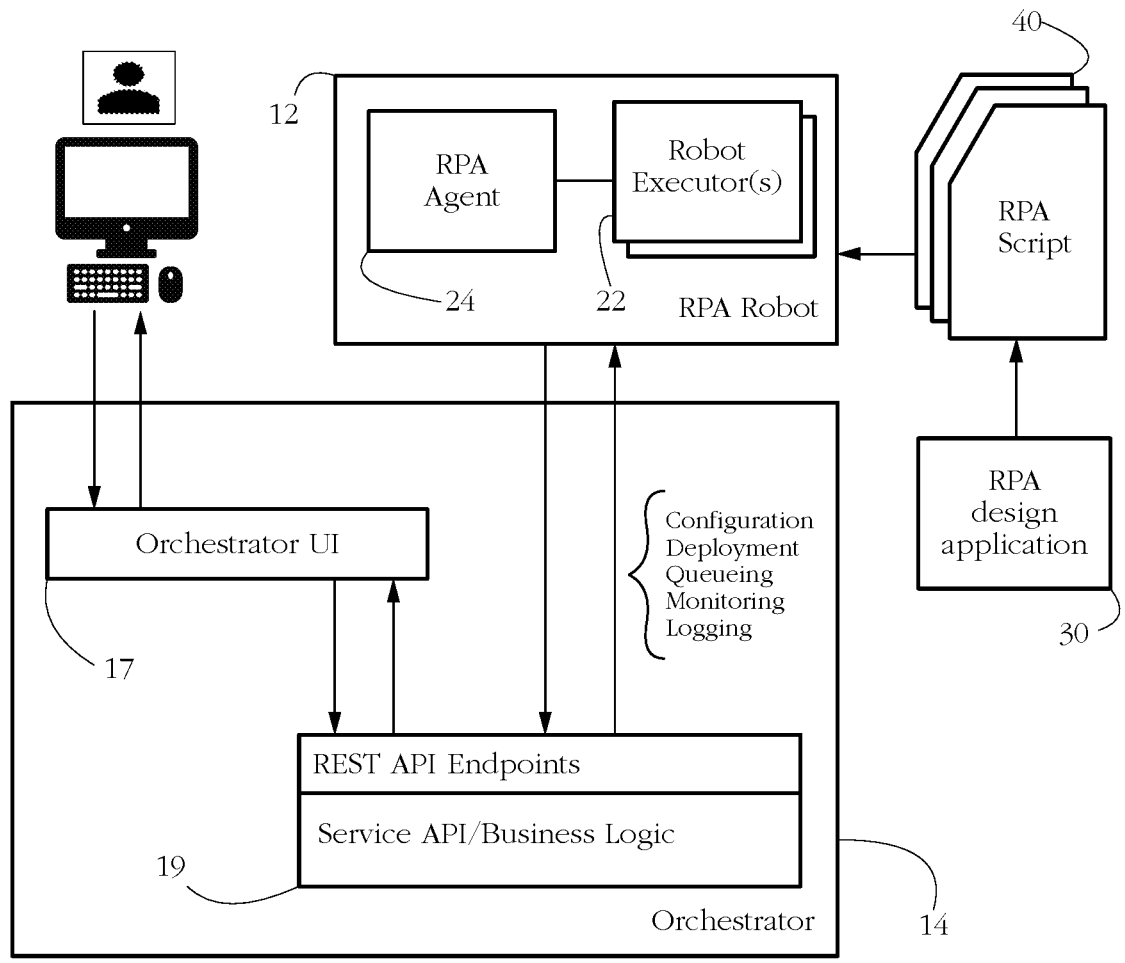
FIG. 2 illustrates exemplary components and operation of an RPA robot and orchestrator according to some embodiments of the present invention.

Once a workflow is developed, it may be encoded in computer-readable form as a set of RPA scripts 40 (FIG. 2). RPA scripts 40 may be formulated according to any data specification known in the art, for instance in a version of an extensible markup language (XML), Javascript Object Notation (JSON), or a programming language such as C#, Visual Basic, Java, etc. Alternatively, RPA scripts 40 may be formulated in an RPA-specific version of bytecode, or even as a sequence of instructions formulated in a natural language such as English, Spanish, Japanese, etc. In some embodiments, scripts 40 are pre-compiled into a set of native processor instructions (e.g., machine code.)

A skilled artisan will appreciate that RPA design application 30 may comprise multiple components/modules, which may execute on distinct physical machines. In one such example illustrating a cloud computing embodiment of the present invention, RPA design application 30 may execute in a client-server configuration, wherein one component of application 30 may expose a robot design interface to a user of a client computer, and another component of application 30 executing on a server computer may assemble the robot workflow and formulate/output RPA script 40. For instance, a developer may access the robot design interface via a web browser executing on the client computer, while the software processing the user input received at the client computer actually executes on the server computer.

Once formulated, scripts 40 may be executed by a set of robots 12a-c (FIG. 1), which may be further controlled and coordinated by an orchestrator 14. Robots 12a-c and orchestrator 14 may each comprise a plurality of computer programs, which may or may not execute on the same physical machine. Exemplary commercial embodiments of robots 12a-c and orchestrator 14 include UiPath Robots™ and UiPath Orchestrator™, respectively. Types of robots 12a-c include, but are not limited to, attended robots, unattended robots, development robots (similar to unattended robots, but used for development and testing purposes), and non-production robots (similar to attended robots, but used for development and testing purposes).

Attended robots are triggered by user events and/or commands and operate alongside a human operator on the same computing system. In some embodiments, attended robots can only be started from a robot tray or from a command prompt and thus cannot be controlled from orchestrator 14 and cannot run under a locked screen, for example. Unattended robots may run unattended in remote virtual environments and may be responsible for remote execution, monitoring, scheduling, and providing support for work queues.

Orchestrator 14 may have various capabilities including, but not limited to, provisioning, deployment, configuration, queueing, monitoring, logging, and/or providing interconnectivity for robots 12a-c. Provisioning may include creating and maintaining connections between robots 12a-c and orchestrator 14. Deployment may include ensuring the correct delivery of software (e.g, RPA scripts 40) to robots 12a-c for execution. Configuration may include maintenance and delivery of robot environments and workflow configurations. Queueing may include providing management of queues and queue items. Monitoring may include keeping track of robot state and maintaining user permissions. Logging may include storing and indexing logs to a database and/or another storage mechanism (e.g., SQL, ElasticSearch™, Redis™) Orchestrator 14 may further act as a centralized point of communication for third-party solutions and/or applications.

FIG. 2 shows exemplary components of a robot 12 and orchestrator 14 according to some embodiments of the present invention. An exemplary RPA robot is constructed using a Windows™ Workflow Foundation Application Programming Interface from Microsoft, Inc. Robot 12 may comprise a set of executors 22 and an RPA agent 24. Robot executors 22 are configured to receive RPA script 40 indicating a sequence of activities that mimic the actions of a human operator carrying out a business process, and to actually perform the respective sequence of activities on the respective client machine. In some embodiments, robot executor(s) 22 comprise an interpreter (e.g., a just-in-time interpreter or compiler) configured to translate RPA script 40 into a runtime package comprising processor instructions for carrying out the operations described in the respective script. Executing script 40 may thus comprise executor(s) 22 translating RPA script 40 and instructing a processor of the respective host machine to load the resulting runtime package into memory and to launch the runtime package into execution.

RPA agent 24 may manage the operation of robot executor(s) 22. For instance, RPA agent 24 may select tasks/scripts for execution by robot executor(s) 22 according to an input from a human operator and/or according to a schedule. Agent 24 may start and stop jobs and configure various operational parameters of executor(s) 22. When robot 12 includes multiple executors 22, agent 24 may coordinate their activities and/or inter-process communication. RPA agent 24 may further manage communication between RPA robot 12 and orchestrator 14 and/or other entities.

In some embodiments executing in a Windows™ environment, robot 12 installs a Microsoft Windows™ Service Control Manager (SCM)-managed service by default. As a result, such robots can open interactive Windows™ sessions under the local system account and have the processor privilege of a Windows™ service. For instance, a console application may be launched by a SCM-managed robot. In some embodiments, robot 12 can be installed at a user level of processor privilege (user mode, ring 3.) Such a robot has the same rights as the user under which the respective robot has been installed. For instance, such a robot may launch any application that the respective user can. On computing systems that support multiple interactive sessions running simultaneously (e.g., Windows™ Server 2012), multiple robots may be running at the same time, each in a separate Windows™ session, using different usernames.

In some embodiments, robot 12 and orchestrator 14 may execute in a client-server configuration. It should be noted that the client side, the server side, or both, may include any desired number of computing systems (e.g., physical or virtual machines) without deviating from the scope of the invention. In such configurations, robot 12 including executor(s) 22 and RPA agent 24 may execute on a client side. Robot 12 may run several workflows concurrently. RPA agent 24 (e.g., a Windows™ service) may act as a single client-side point of contact of executors 22. Agent 24 may further manage communication between robot 12 and orchestrator 14. In some embodiments, communication is initiated by agent 24, which may open a WebSocket channel to orchestrator 14. Agent 24 may subsequently use the channel to transmit notifications regarding the state of each executor 22 to orchestrator 14. In turn, orchestrator 14 may use the channel to transmit acknowledgements, job requests, and other data such as RPA scripts 40 to robot 12.

Orchestrator 14 may execute on a server side, possibly distributed over multiple physical machines. In one such embodiment, orchestrator 14 may include an orchestrator user interface (UI) 17 which may be a web application, and a set of service modules 19. Service modules 19 may further include a set of Open Data Protocol (OData) Representational State Transfer (REST) Application Programming Interface (API) endpoints, and a set of service APIs/business logic. A user may interact with orchestrator 14 via orchestrator UI 17 (e.g., by opening a dedicated orchestrator interface on a browser), to instruct orchestrator 14 to carry out various actions, which may include for instance starting jobs on robot 12, creating robot groups, assigning workflows to robots, adding/removing data in queues, scheduling jobs to run unattended, analyzing logs per robot or workflow, etc. Orchestrator UI 17 may use Hypertext Markup Language (HTML), JavaScript (JS), or any other data format known in the art.

Orchestrator 14 may carry out actions requested by the user by selectively calling service APIs/business logic. In addition, orchestrator 14 may use the REST API endpoints to communicate with robot 12. The REST API may include configuration, logging, monitoring, and queueing functionality. The configuration endpoints may be used to define and configure application users, permissions, robots, assets, releases, etc. Logging REST endpoints may be used to log different information, such as errors, explicit messages sent by the robots, and other environment-specific information, for instance. Deployment REST endpoints may be used by robots to query the version of RPA script 40 to be executed. Queueing REST endpoints may be responsible for queues and queue item management, such as adding data to a queue, obtaining a transaction from the queue, setting the status of a transaction, etc. Monitoring REST endpoints may monitor the web application component of orchestrator 14 and RPA agent 24.

In some embodiments, RPA environment 10 (FIG. 1) further comprises a database server 16 connected to an RPA database 18. In an embodiment wherein server 16 is provisioned on a cloud computing platform, server 16 may be embodied as a database service, e.g., as a client having a set of database connectors. Database server 16 is configured to selectively store and/or retrieve data related to RPA environment 10 in/from database 18. Such data may include configuration parameters of various robots 12a-c, robot groups, as well as data characterizing workflows executed by various robots, and data characterizing users, roles, schedules, queues, etc. Another exemplary category of data stored and/or retrieved by database server 16 includes data characterizing the current state of each executing robot. Yet another exemplary category of data includes messages logged by various robots during execution. Database server 16 and database 18 may employ any data storage protocol and format known in the art, such as structured query language (SQL), ElasticSearch™, and Redis™, among others. In some embodiments, data is gathered and managed by orchestrator 14, for instance via logging REST endpoints. Orchestrator 14 may further issue structured queries to database server 16.

In some embodiments, RPA environment 10 (FIG. 1) further comprises communication channels/links 15a-e interconnecting various members of environment 10. Such links may be implemented according to any method known in the art, for instance as virtual network links, virtual private networks (VPN), or end-to-end tunnels. Some embodiments further encrypt data circulating over some or all of links 15a-e.

Figure 3:
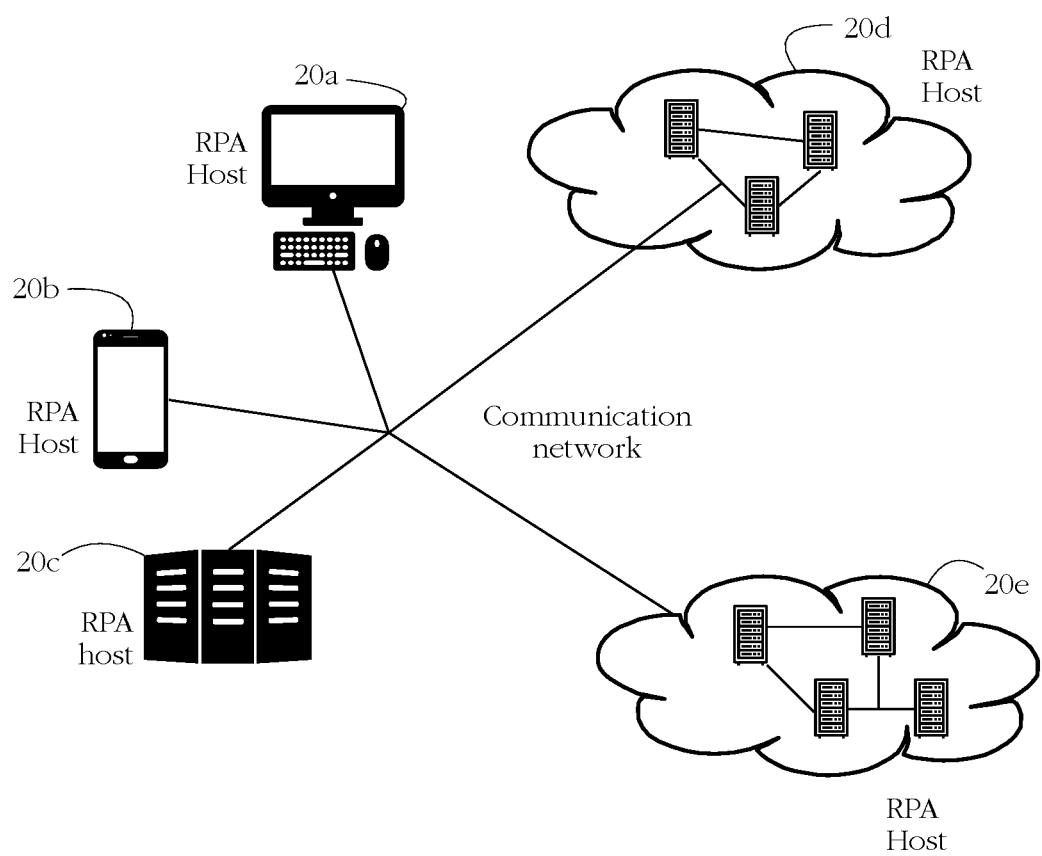
FIG. 3 shows a variety of RPA host systems according to some embodiments of the present invention.

A skilled artisan will understand that various components of RPA environment 10 may be implemented and/or may execute on distinct host computer systems (physical appliances and/or virtual machines.) FIG. 3 shows a variety of such RPA host systems 20a-e according to some embodiments of the present invention. Each host system 20a-e represents a computing system (e.g. an individual computing appliance, or a set of interconnected computers) having at least a hardware processor, a memory unit and a network adapter enabling the respective RPA host to connect to a computer network and/or to other computing devices. Exemplary RPA hosts 20a-c include personal computers, laptop and tablet computers, mobile telecommunication devices (e.g., smartphones), and corporate mainframe computers, among others. Other exemplary hosts illustrated as hosts 20d-e include cloud computing platforms such as server farms operated by Amazon™ AWS and Microsoft™ Azure™. A cloud computing platform comprises a plurality of interconnected server computer systems centrally-managed according to a platform-specific protocol. Clients may interact with such cloud computing platforms using platform-specific interfaces/software layers/libraries (e.g., software development kits—SDKs, plugins, etc.) and/or a platform-specific syntax of commands. Exemplary platform-specific interfaces include the Azure™ SDK and AWS™ SDK, among others.

Figure 4:
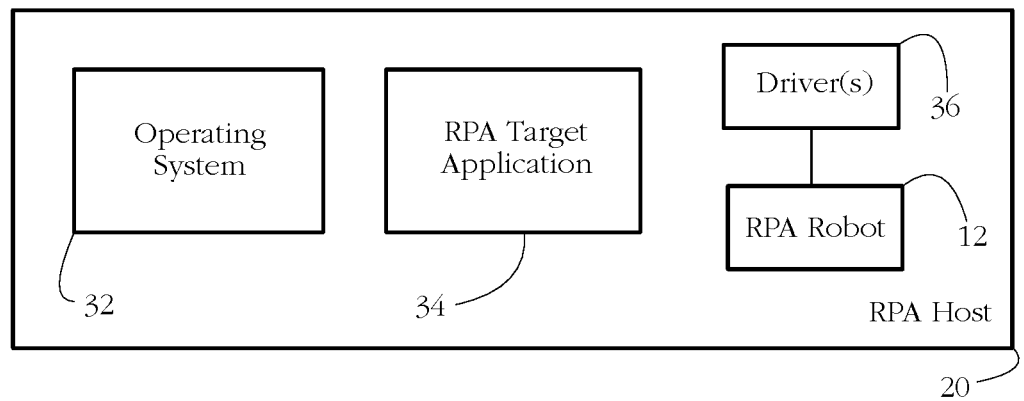
FIG. 4 shows exemplary RPA components executing on an RPA host according to some embodiments of the present invention.

FIG. 4 shows exemplary software executing on an RPA host 20 according to some embodiments of the present invention. The illustrated RPA host 20 generically represents any of RPA hosts 20a-e in FIG. 3. In some embodiments, beside an RPA robot 12, RPA host 20 executes an operating system (OS) 32 and an instance of an RPA target application 34, i.e., the software application targeted for automation by robot 12. In some embodiments that employ hardware virtualization technologies, some or all of the illustrated components may execute within a virtual machine (VM).

OS 32 may comprise any widely available operating system such as Microsoft Windows™ MacOS™, Linux™, iOS™, or Android™, among others, comprising a software layer that interfaces between application 34 and the hardware of RPA host 20. RPA target application 34 generically represents any computer program used by a human operator to carry out a task. Exemplary applications 34 include, among others, a word processor, a spreadsheet application, a graphics application, a browser, a social media application, a gaming application, and an electronic communication application.

In some embodiments, robot 12 carries out user interface automation activities by interfacing with a set of drivers 36 executing on the respective host. Driver(s) 36 generically represent software modules that carry low-level operations such as moving a cursor on screen, registering and/or executing mouse, keyboard, and/or touchscreen events, detecting a current posture/orientation of a handheld device, detecting a current accelerometer reading, taking a photograph with a smartphone camera, etc. Some such drivers 36 form a part of operating system 30. Others may implement various application-specific aspects of a user's interaction with to complex target applications 34 such as SAP™, Citrix™ virtualization software, Excel™, etc. Such drivers 36 may include, for instance, browser drivers, virtualization drivers, and enterprise application drivers, among others. Other exemplary drivers 36 include the Microsoft™ WinAppDriver, XCTest drivers from Apple, Inc., and UI Automator drivers from Google, Inc.

Figure 5:
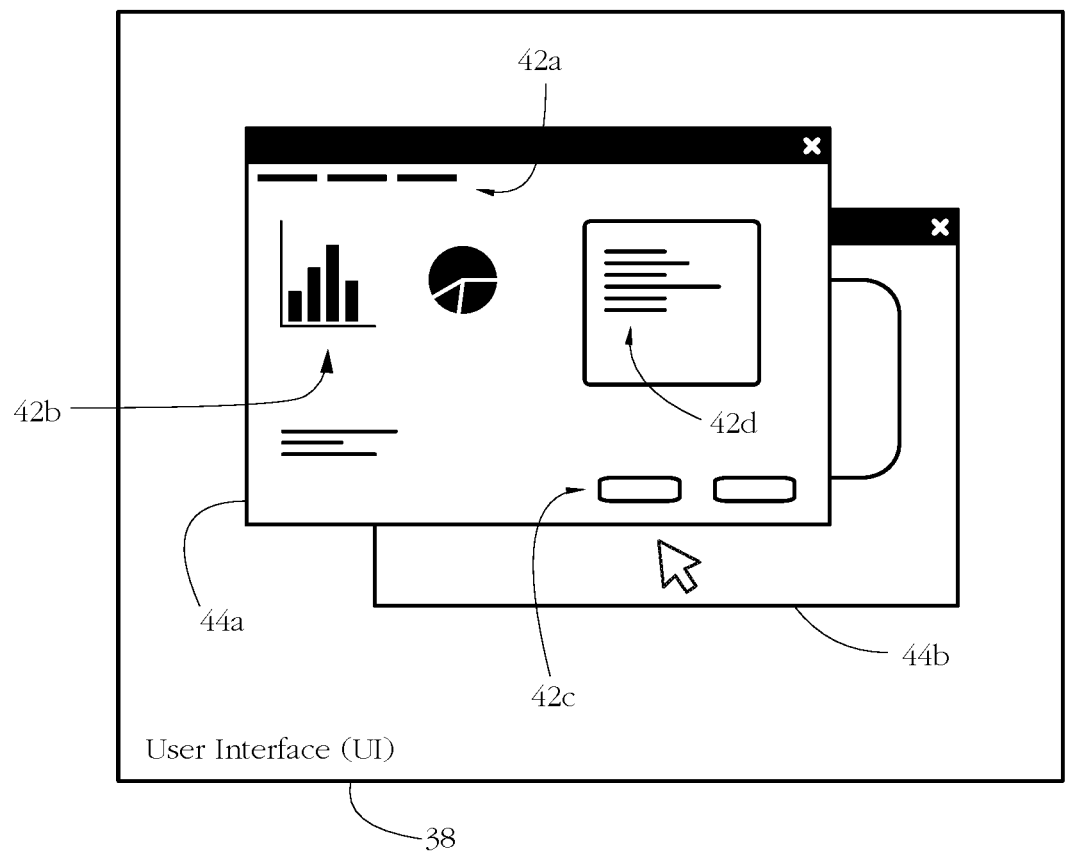
FIG. 5 shows an exemplary user interface (UI) having a plurality of UI elements according to some embodiments of the present invention.

RPA target application 34 is typically configured to expose a user interface (UI). A user interface is a computer interface that enables human-machine interaction, e.g., an interface configured to receive user input and to respond to the respective input. A common example of user interface is known as a graphical user interface (GUI), which enables human-machine interaction via a set of visual elements displayed to the user. FIG. 5 shows such an exemplary UI 38 according to some embodiments of the present invention. Illustrative UI 38 has a set of exemplary windows 44a-b and a set of exemplary UI elements including a menu indicator 42a, an icon 42b, a button 42c, and a text box 42d. Other exemplary UI elements comprise, among others, a window, a label, a form, an individual form field, a toggle, a link (e.g., a hyperlink, hypertext, or a uniform resource identifier). UI elements may display information, receive input (text, mouse events) and/or control a functionality of software and/or the respective computer system.

Some UI elements are interactive in the sense that acting on them (e.g., clicking button 42c) triggers a behavior/reaction. Such behaviors/reactions are typically specific to the respective element or to a group of elements. For instance, clicking a save button produces a different effect to clicking a print button. The same keyboard shortcut (e.g., Ctrl-G) may have one effect when executed in one window/ application, and a completely different effect when executed in another window/application. So, although the operation/action/activity is the same (executing a click, pressing a combination of keyboard keys, writing a sequence of characters, etc.), the result of the respective action may depend substantially on the operand of the respective operation. An operand is herein defined as the UI element that is acted upon by a current activity such as a click or a keyboard event, or stated otherwise, the UI element selected to receive the respective user input. The terms 'operand' and 'target' are herein used interchangeably.

Some embodiments attach a selector to each target UI element, the selector comprising a data structure that selectively identifies the respective element among the plurality of UI elements of UI interface 38. In one exemplary embodiment, the selector indicates a position of the respective UI element in an object hierarchy of UI interface 38, such as a GUI tree or DOM model. GUI object hierarchies may be encoded in computer-readable form in a language such as XML or JSON, among others. One exemplary selector may indicate that the respective UI element is a form field of a specific form displayed within a specific UI window. The selector of a target UI element may be specified at design time by including an encoding of the respective selector in an RPA script configured to carry out an activity on the respective UI element. At runtime, robot 12 may attempt to identify the target UI element within a runtime instance of the target UI according to the respective selector and possibly according to other information such as an image of the respective UI element and/or a text displayed on the respective UI element.

Figure 6:
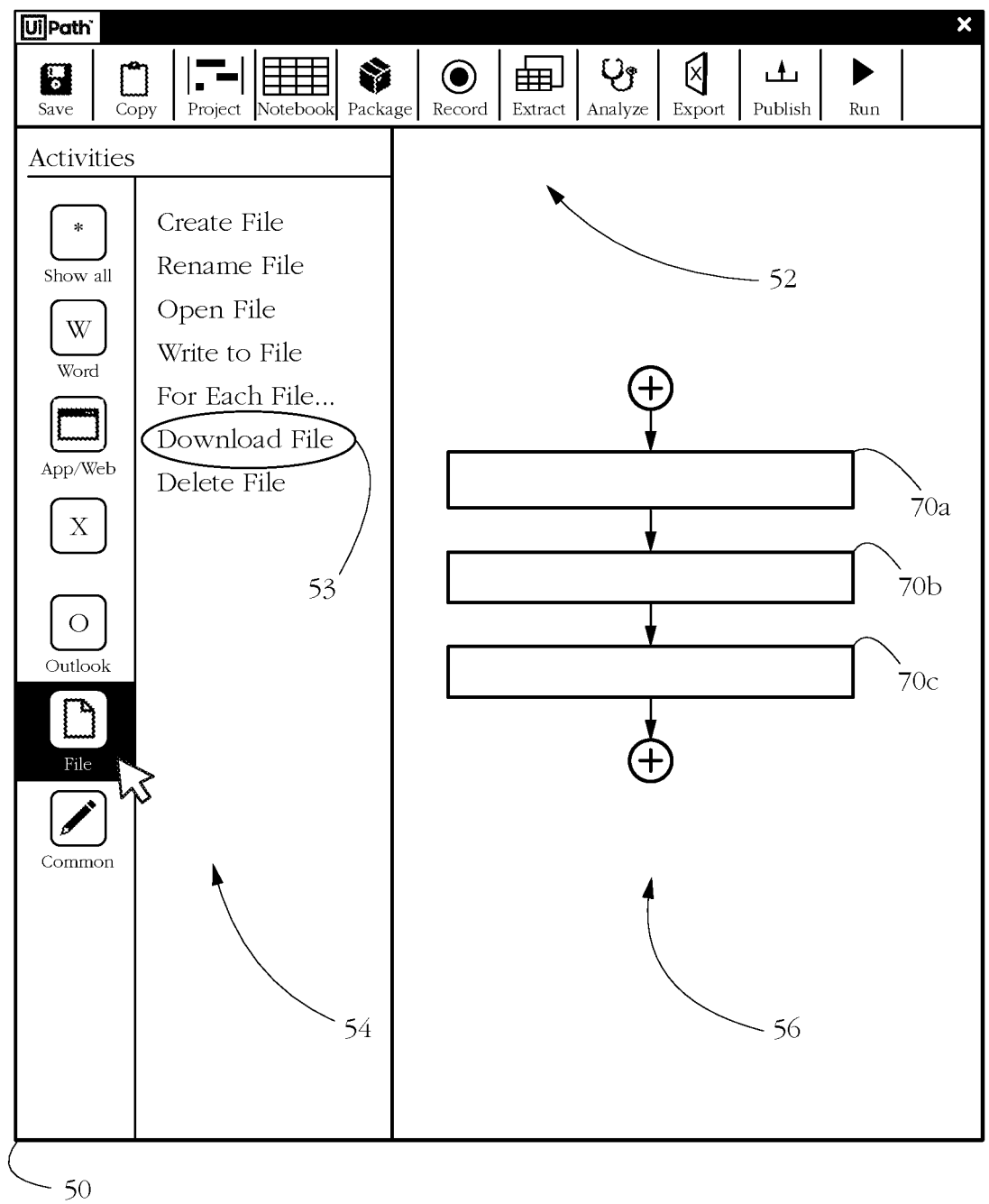
FIG. 6 illustrates an exemplary robot design interface exposed by an RPA design application according to some embodiments of the present invention.

FIG. 6 shows an exemplary robot design interface 50 exposed by RPA design application 30 according to some embodiments of the present invention. Interface 50 may be configured to enable a user to program RPA robot 12 by using a set of intuitive visual tools, instead of coding per se. For instance, interface 50 may enable the user to build a robot from a set of individual building blocks assembled in sequence. Such building blocks may comprise various activities, such as opening an instance of RPA target application 34, clicking on a UI element of application 34, filling out a form field, etc.

In one example illustrated in FIG. 6, robot design interface 50 comprises a main menu/ribbon 52 including a plurality of menu items for performing actions such as opening, saving, and managing robot projects, recording a set of actions to be performed by robot 12, and executing robot 12, among others. Robot design interface 50 may further expose an activity menu 54 listing a plurality of activities for building robots. In some embodiments, activity menu 54 includes a dedicated menu item 53 (e.g., titled 'Download File') for automating a file download activity.

For convenience, activity menu 54 may be organized into a hierarchy of submenus. In the example of FIG. 6, available activities are organized into submenus according to a type of RPA target application (e.g., activities for interacting with Microsoft Word™ are grouped together into a submenu, while activities for interacting with a web browser are grouped into another submenu.) Other grouping criteria may be used to organize activity menu 54, for instance, activities may be grouped according to a type of target object: file-related activities such may be grouped together into a submenu, while image-related activities may be grouped into another submenu. FIG. 6 illustrates an exemplary expanded activity submenu labeled 'File', comprising activities for interacting with files. Exemplary file activities include, among others, opening, creating, deleting, moving, and downloading a file, and changing the value of a selected file attribute such as a filename or an access permission.

Unless otherwise specified, the term 'file' is used herein to denote a computer file, i.e., a computer resource for storing a self-contained/separate set of data on a computer-readable medium such as a hard disk, optical, or solid-state storage device. Files are characterized by a set of attributes, which typically include a filename and a set of permissions for accessing the respective data. Typically, files are organized according to a file system, which keeps track of where file data is located on the respective physical medium and enables/controls user access. Exemplary file systems include the file allocation table (FAT), NT file system (NTFS), and extended (EXT) file systems, among others. Unless otherwise specified, the terms 'folder' and 'directory' are herein used interchangeably to denote a specific file system structure identifying a selected collection of computer files. Folders/directories are therefore virtual constructs used for hierarchically organizing/grouping files. In some embodiments, a folder is a special kind of file, itself identified by a name and characterized by a set of access permissions. Placing/saving/downloading a file into a folder effectively creates an association between the respective folder and file, thus enabling accessing the respective file via the respective folder. Unless otherwise specified, downloading a file herein denotes employing software executing on a first machine to fetch a content of a selected file from a remote location (e.g., a second machine) and to store the respective file content on computer-readable media belonging to, or communicatively coupled to, the first machine. Downloading herein refers to fetching an entire file, as opposed to streaming, for instance, which typically transfers only parts of a computer file.

In some embodiments, robot design interface 50 further comprises a workflow area configured to display a workflow 56 comprising a visual representation of a set of robotic activities arranged in sequence according to a desired order of execution of the respective activities. In the example of FIG. 6, individual activities are visually represented by activity containers 70a-c connected by arrows in the manner of a computer flowchart. In some embodiments, the user may access each individual activity by clicking inside the respective activity container 70a-c. In response to detecting such a click, some embodiments may expose an activity configuration interface enabling the user to configure various aspects of the respective activity, as further detailed below.

Figure 7:
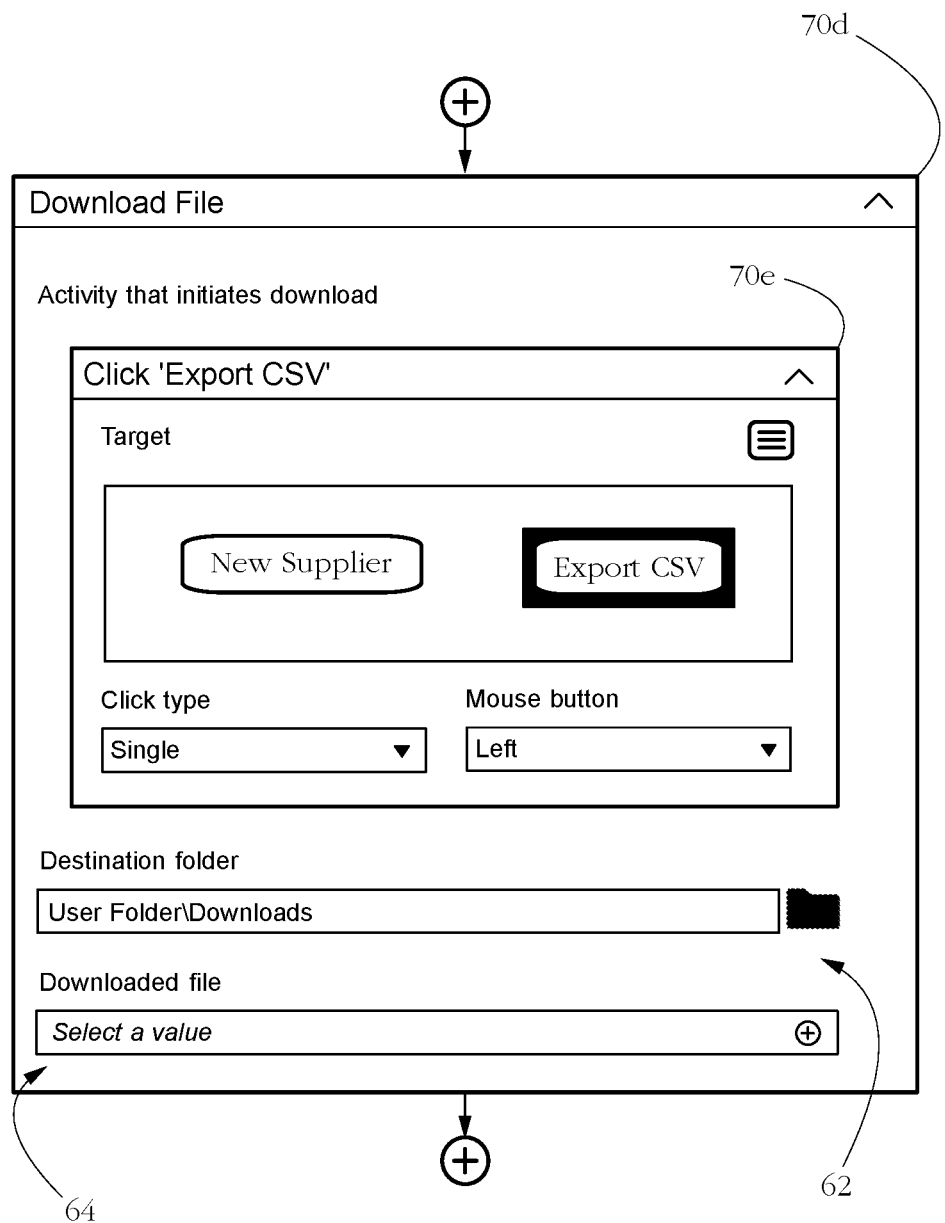
FIG. 7 shows an exemplary activity configuration interface for configuring a file download activity according to some embodiments of the present invention.

In some embodiments, invoking file download menu item 53 causes RPA design interface 50 to insert a file download activity into workflow 56, for instance by adding an activity container associated with a file download activity to the workflow area of interface 50. FIG. 7 illustrates such an activity container 70d according to some embodiments of the present invention, container 70d further exposing an activity configuration interface enabling the user to configure an RPA file download activity by setting various activity parameters. In some embodiments, configurable parameters of a file download activity include a download trigger activity, i.e., an activity that initiates the respective download. One exemplary trigger activity comprises clicking a target UI element of RPA target application 34, for instance clicking a button or hyperlink exposed by a particular webpage. Another exemplary trigger event comprises opening an instance of a browser window/tab at a specific URL. Other exemplary trigger activities include a keyboard event (for instance, pressing 'Enter' or a specified combination of keys), a timeout event (expiration of a specified wait time), and a disappearance of a specific UI element from the target interface (e.g., disappearance of a popup window instructing the user to wait while the download target file is being prepared).

Some embodiments enable the user to configure the download trigger activity in an intuitive, visual manner by using tools exposed by RPA design interface 50. For instance, the user may select the trigger activity (e.g., a mouse click as illustrated in FIG. 7) from activity menu 54. In response, RPA design application 30 may display an activity container 70*e* nested within container 70*d*, container 70*e* corresponding to the trigger activity. Some embodiments enable the user to indicate the trigger activity by dragging container 70*e* from the workflow area into activity container 70*d*. Activity container 70*e* may further expose an activity configuration interface for configuring the trigger activity. In the example illustrated in FIG. 7, the download trigger activity comprises clicking the "Export CSV" button displayed within a UI exposed by RPA target application 34 (e.g., an instance of a browser application). Configuring an RPA click activity goes beyond the scope of the present description.

Configurable parameters of a file download activity according to some embodiments of the present invention may further include a destination folder for the downloaded file. The destination folder may be located on a local storage device (e.g., hard drive), or on another computer system communicatively coupled to the RPA host configured to execute the RPA robot which forms the object of the current design process. The activity configuration interface associated with container 70*d* (FIG. 7) may receive a user input indicating a destination folder via a set of dedicated controls 62, which may include a text input field configured to receive an indicator of a location of the destination folder. An exemplary location indicator may include a file system path indicator (e.g., absolute path, relative path with respect to some reference folder, network address, etc.). Some embodiments further enable the user to select the destination folder from a list, by clicking the folder symbol next to the destination folder input field in the example of FIG. 7.

Some embodiments further associate a label/alias with the downloaded file, thus enabling the user to access various attributes of the downloaded file by reference to the respective alias, as shown below. A download alias may consist of a user-provided alphanumeric character string, which identifies the respective downloaded file from a plurality of other files. The download alias may or may not coincide with the actual filename of the downloaded file. Some embodiments rely on the observation that the user may not know the filename of the downloaded file until the respective file actually finishes downloading, so a download alias may provide a convenient alternative name/handle for the respective file. Some embodiments receive a user input indicating a file alias via a dedicated control 64 (e.g. a text input field as illustrated in FIG. 7).

Figure 8:
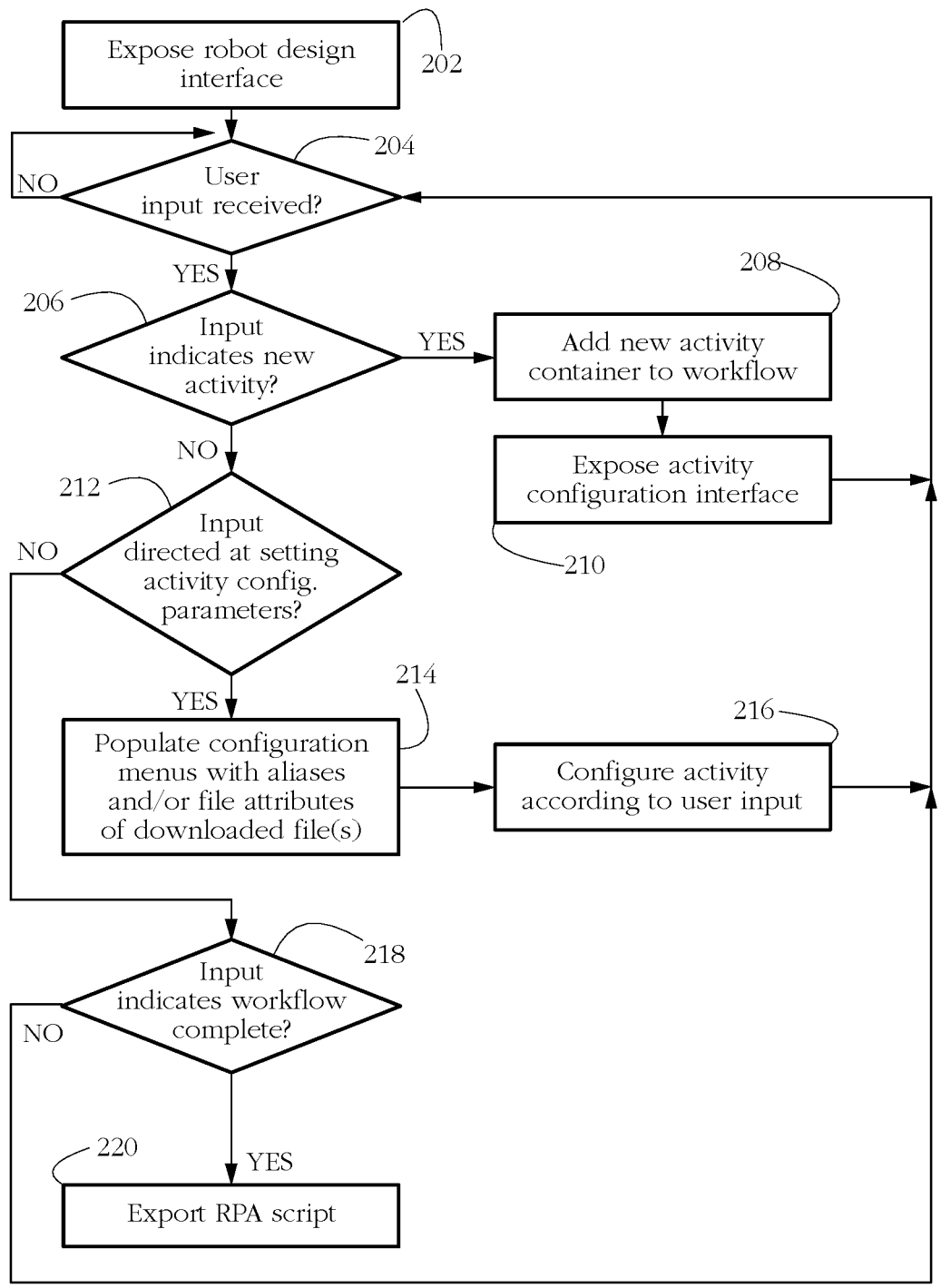
FIG. 8 shows an exemplary sequence of steps performed by the RPA design application according to some embodiments of the present invention.

FIG. 8 shows an exemplary sequence of steps carried out by RPA design application 30 in a process of designing an RPA robot according to some embodiments of the present invention. A step 202 may expose robot design interface 50 to the user (see exemplary interface illustrated in FIG. 6). Application 30 may then wait for user input. When a user input is detected, for instance when the user interacts with one of the menus of interface 50, a step 206 determines whether the received input indicates a request to add a new activity to a current workflow. When yes (for instance in response to the user selecting an item from activity menu 54), a sequence of steps 208-210 may add a new activity container to the current workflow (see e.g., containers 70*a-c* in FIG. 6), and expose an activity configuration interface enabling the user to set activity-specific parameters for the respective activity.

A step 212 determines whether the received user input is directed at configuring an RPA activity/setting configuration parameters. When yes (e.g., when the user has interacted with a control for setting an activity parameter), a step 216 may set configuration parameters for the respective activity according to the user input. For instance, a file download activity may be configured by indicating a download trigger activity, a destination folder and/or a download alias for the downloaded file. See e.g., detailed description above, in relation to FIG. 7.

Figure 9:
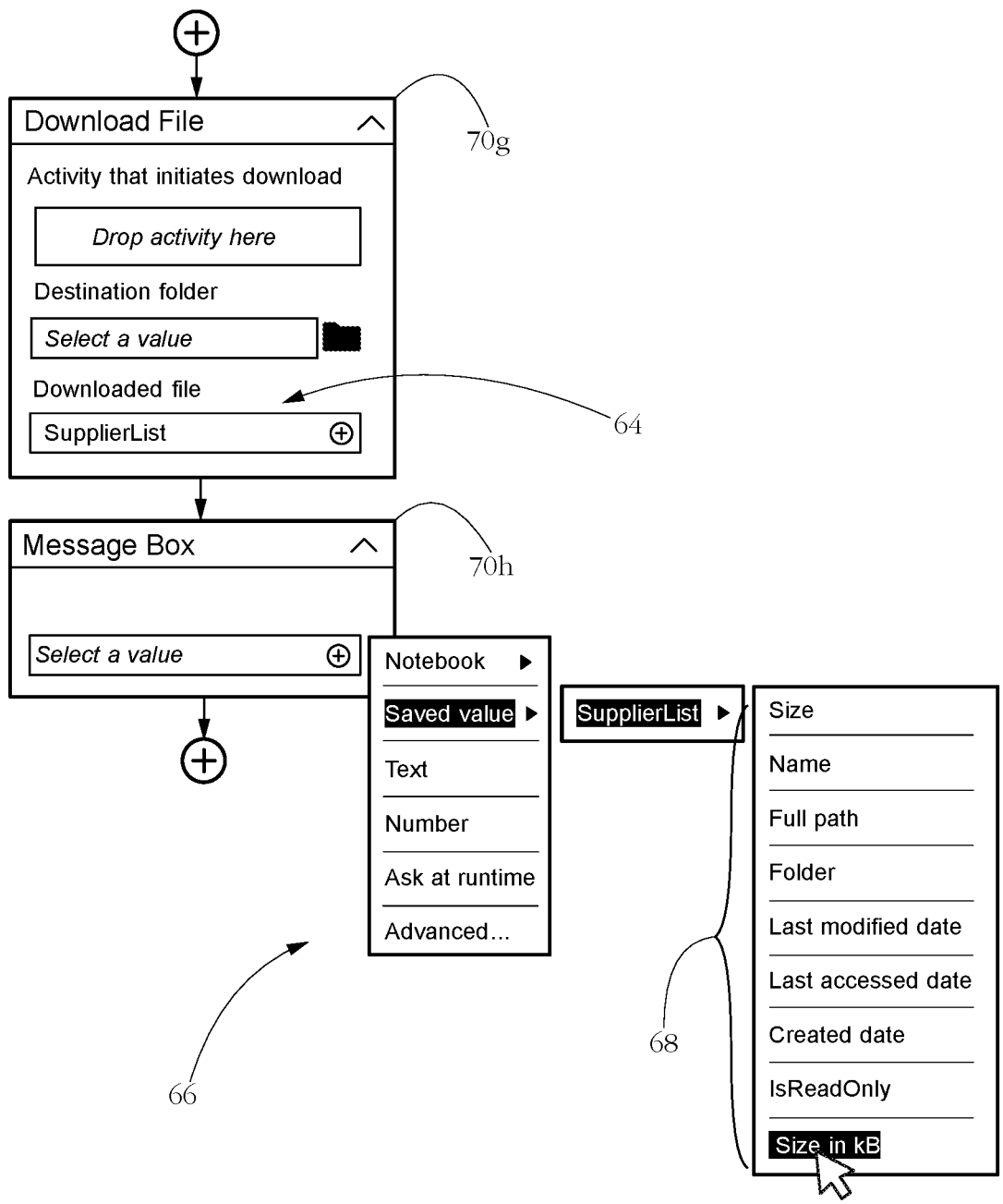
FIG. 9 illustrates exemplary cascading menus for configuring RPA activities according to some embodiments of the present invention.

Some embodiments allow configuring various activity parameters via a set of parameter-specific menus, for instance dropdown menus activated by clicking a specific interface control. FIG. 9 illustrates a set of RPA activity containers 70*g-h* and a set of activity configuration menus 66 according to some embodiments of the present invention. Container 70*g* represents a file download activity, while container 70*h* represents a subsequent activity of displaying a message box (e.g., a pop-up) to the user in response to executing the preceding file download activity. The message box represented by container 70*h* may use a result of the file download activity. In some embodiments, clicking on a selected control (e.g., the circled plus icon next to the 'Select a value' message in container 70*h*) may progressively unfold a cascading configuration menu 66 enabling the user to select from a plurality of available values for the respective configuration parameter (in the illustrated case, a content of the message to be displayed to the user).

In some embodiments, in a step 214 (FIG. 8), RPA design application 30 may populate configuration menu(s) 66 with download aliases defined as part of configuring file download activities of the respective workflow. In the example of FIG. 9, the user has provided the text 'SupplierList' to input control 64, indicating that the end result of the file download activity represented by container 70*g* may be referred to by the download alias 'SupplierList'. In response, configuration menu 66 is populated with the respective alias; selecting the respective alias may further expose to the user for selection a plurality of file attributes 68 of the downloaded file identified by the respective alias. File attributes may include, among others, a file name, a size, and a timestamp of the respective downloaded file. In some embodiments, selecting an attribute 68 from configuration menu 66 causes RPA robot 12 to carry out the respective RPA activity according to a runtime value of the respective file attribute. For instance, the example illustrated in FIG. 9 instructs RPA robot 12 to display a popup message to the user indicating a file size of the downloaded file.

For simplicity, FIG. 9 shows only one download alias ("SupplierList"). When multiple download aliases are defined within the current workflow, configuration menu 66 may include multiple download aliases, each alias corresponding to a distinct downloaded file. Furthermore, the displayed selection of file attributes is only illustrative; an artisan will appreciate that file attributes 68 may include any other file attributes not shown here, as well as combinations of multiple file attributes, and/or other quantities determined according to file attributes 68.

When the user input received in step 204 (FIG. 8) indicates that the current robot design session is complete (step 218 produces a YES), then in a step 220 RPA design application may export RPA script 40 comprising a computer-readable encoding of the instructions for RPA robot 12. RPA script 40 may then be transmitted to RPA robot 12 for execution.

Figure 10:
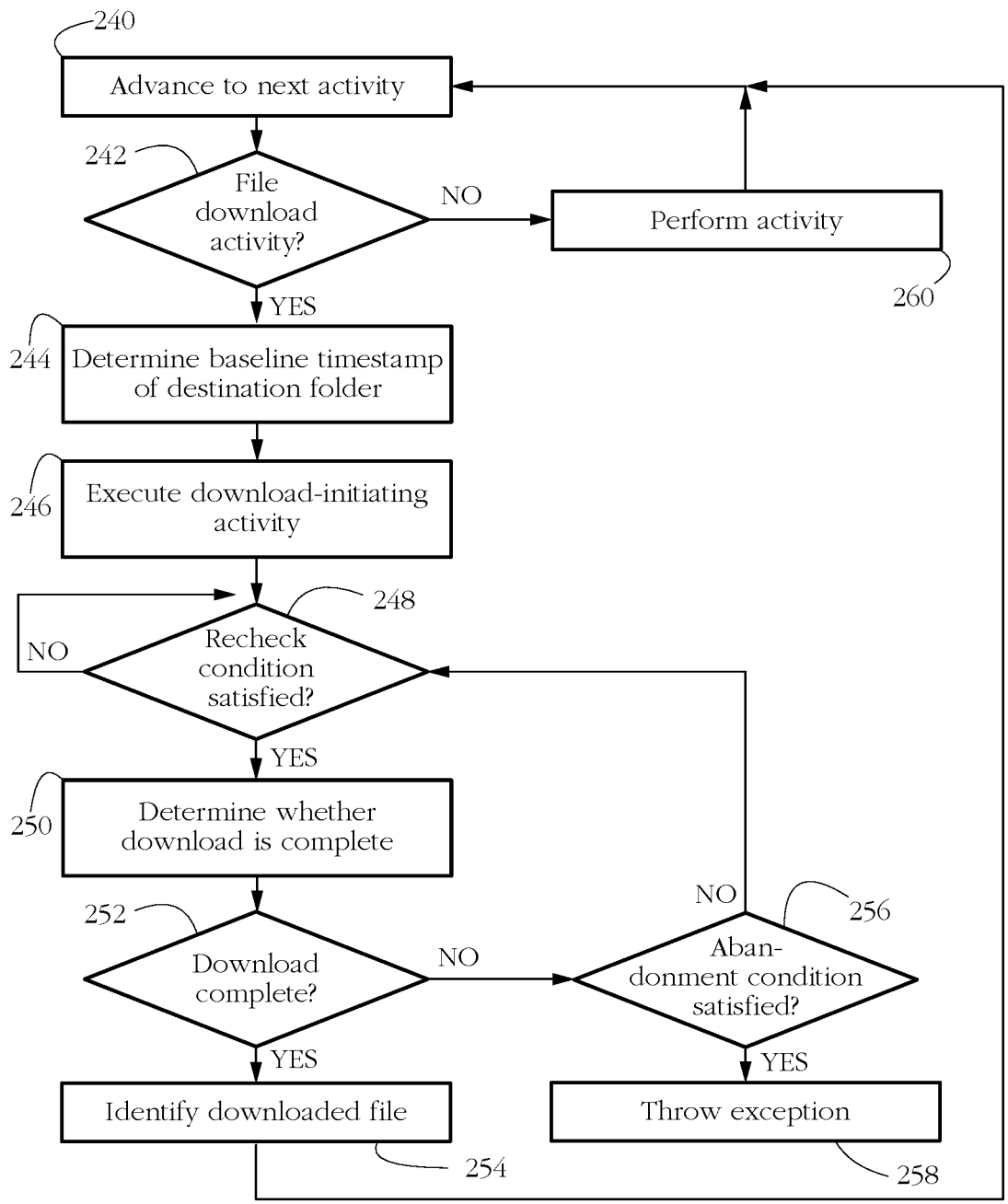
FIG. 10 shows an exemplary sequence of steps performed by an RPA robot according to some embodiments of the present invention.

FIG. 10 shows an exemplary sequence of steps performed by robot 12 at runtime, according to some embodiments of the present invention. For each activity of the workflow, a step 242 may determine whether the current activity is a file download activity. When no, robot 12 may perform the respective activity using any methods/means known in the art (step 260). When yes, some embodiments may execute the respective trigger activity to initiate the file download. As described in detail above in relation to FIG. 7, the download trigger may comprise clicking on a selected hyperlink exposed within a web browser interface, for instance. Some embodiments may then suspend/block execution of a subsequent RPA activity of the respective workflow until the current file download activity is complete, which may comprise establishing that the respective file has finished downloading (all file data has been transferred from the remote location). Subsequent RPA activities may be executed according to, or using, a result of the file download activity, such as a content of the downloaded file and/or a runtime value of a file attribute such as filename or size of the downloaded file.

To ensure that the download is complete before proceeding with subsequent RPA activities, some embodiments may repeatedly check for download completion. In some embodiments, a sequence of steps 248-250 determines whether a re-check condition is satisfied, and when yes, determines whether the respective download is complete. In one example, robot 12 may check for completeness periodically, at equal time intervals (e.g., every second). In an alternative scenario, robot 12 may check whether the respective download is complete in response to detecting a change in the composition of the destination folder (e.g., when a file has been added to or deleted from the respective folder). When a step 252 determines that the download is not yet complete, some embodiments may determine whether an abandonment condition is satisfied (step 256), for instance whether an amount of time in excess of a pre-determined threshold has elapsed since the initiation of the respective download, or since execution of the download trigger activity. Such embodiments are configured to detect situations when a file download fails, e.g., due to a network problem. When the abandonment condition is satisfied, some embodiments suspend execution of the current workflow/robot by throwing a software exception. Some embodiments may further notify a user/administrator of the respective runtime RPA host 20. Otherwise, when the abandonment condition is not satisfied, some embodiments return to waiting for the download to finish. When steps 250-252 determine that the current download is complete, a step 254 may identify the downloaded file and associate it with a download alias indicated by the user at design time. Step 254 may comprise determining a set of runtime attribute values of the downloaded file, such as a filename and a size of the downloaded file, and a timestamp associated with the creation of the downloaded file, among others.

Figure 11:
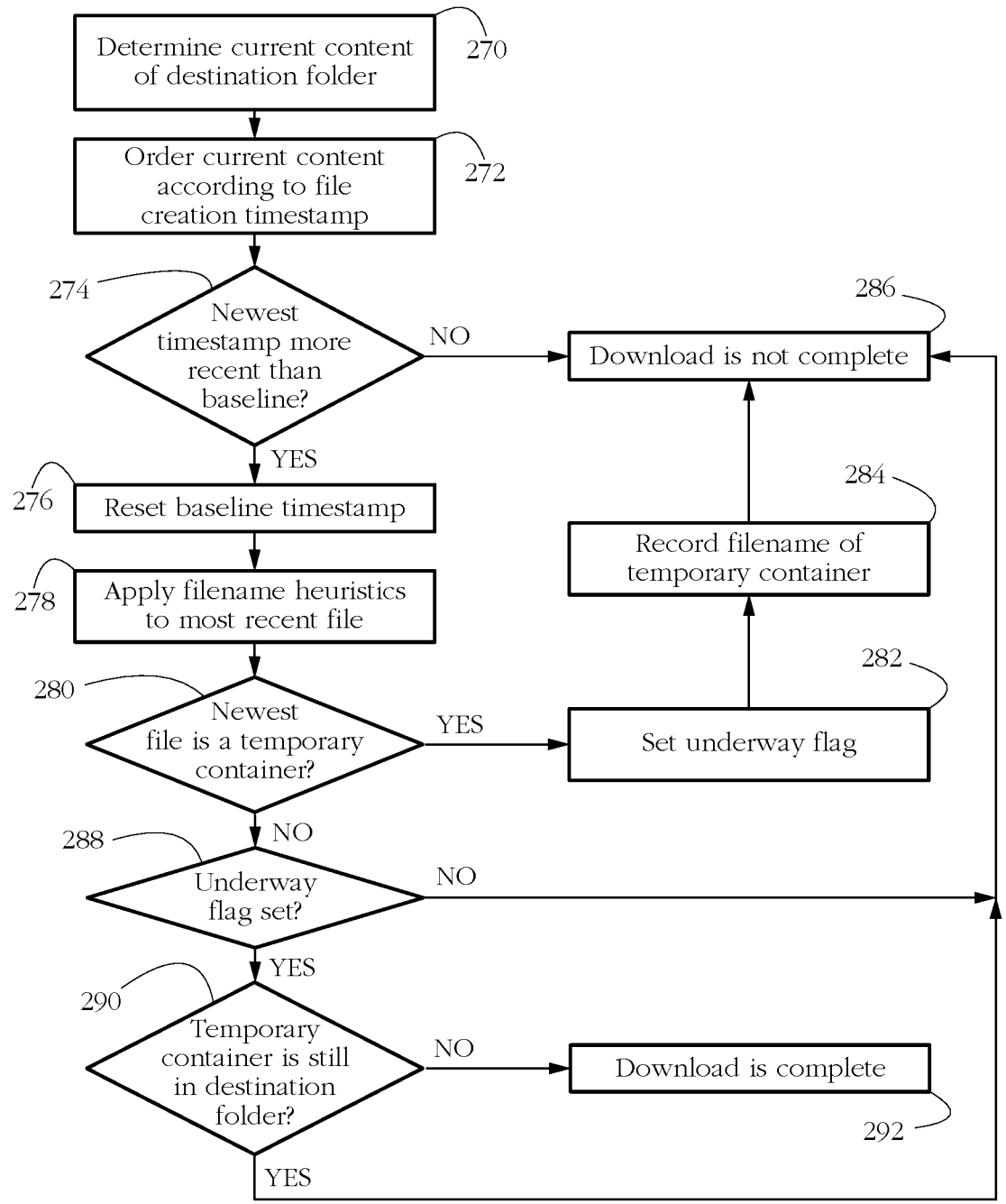
FIG. 11 shows an exemplary sequence of steps performed by the RPA robot according to some embodiments of the present invention, the illustrated sequence configured to determine whether a file download is complete.

FIG. 11 shows an exemplary sequence of steps performed by robot 12 to determine whether a download is complete (step 250), according to some embodiments of the present invention. As a preliminary step, in preparation for initiating the respective file download, some embodiments determine a baseline timestamp of the destination folder (step 244 in FIG. 10). The baseline timestamp may indicate a moment of a most recent event occurring in relation to the destination folder prior to the start of the respective download. For instance, the baseline timestamp may indicate a moment when the latest file was added to the respective folder, or a moment of the latest modification of an existing file before the current download was initiated. Stated otherwise, in determining the baseline timestamp, some embodiments may establish a current state of the destination folder at the moment of initiating the current file download.

Some embodiments rely on the observation that a file download comprises a specific sequence of intermediate steps, and therefore determining whether a download is complete may comprise determining where within the respective sequence the current download currently is. Typically, a file download begins with the creation of a temporary container file which stores the respective file's incoming data as it is progressively being fetched from the remote source. The filename of the temporary container may be generated automatically, e.g., according to a hashing algorithm designed to avoid collisions. Some temporary container filenames may have specific extensions (such as .PART or .CRDOWNLOAD), depending on a type of software application performing the current download. When all the data has been received, the temporary container is renamed to the correct filename of the downloaded file. An observer watching the respective destination folder may therefore notice the appearance of a temporary container, followed by the disappearance of the respective container and quasi-simultaneous appearance of a new file. The flowchart illustrated in FIG. 11 exploits some of these observations.

A sequence of steps 270-272 may determine a current content of the destination folder and sort the respective content according to a file creation timestamp. Stated otherwise, steps 270-272 may determine the moment when a new file was most recently added to the destination folder. A step 274 may then compare the most recent timestamp with the baseline timestamp previously determined in step 244 (FIG. 10). When the newest timestamp is not more recent than the baseline (indicating that the content of the destination folder has not changed since the last check), a step 286 may determine that the current download has not yet finished.

When the newest timestamp is more recent than the baseline, a step 276 may reset the baseline to the timestamp determined in steps 270-272 above. Such a situation may indicate that a new file has appeared in the destination folder. In a further step 278, robot 12 may apply a set of filename heuristics to determine whether the newly appeared file is a temporary download container. Step 278 may comprise, for instance, determining whether the filename of the new file matches a naming pattern of a temporary container, e.g., whether the filename of the new file has a particular extension, whether the respective filename looks random, etc. When the filename heuristics indicate that the new file is a temporary container (step 280 returns a YES), some embodiments may set an internal parameter (e.g., a binary flag) to indicate that a download is currently under way. A step 284 may record the filename of the respective temporary container for later use, and robot 12 may proceed to step 286 to conclude that the current download is not yet complete.

When filename heuristics indicate that the new file is not a temporary container, a step 288 may determine whether the current download is under way, for instance according to a value of the internal underway flag (see step 282 above). When no, robot 12 may conclude the current download is not yet complete. When yes, a step 290 may determine whether the destination folder still contains the temporary container. A yes may be interpreted as an indicator that the current download is not yet complete. When the temporary container has disappeared from the destination folder, some embodiments may advance to a step 292, concluding that the download is complete.

The sequence of steps illustrated in FIG. 11 may allow RPA robot 12 to discern between changes to the destination folder caused by file downloads and other changes such as a user adding, deleting or editing a file while another file is downloading. However, it may not discern between multiple concurrent file downloads, for instance when multiple RPA robots concurrently download files into the same destination folder. Some embodiments may employ other, more sophisticated algorithms to prevent such collisions. For instance, some embodiments may use a built-in functionality of operating system 32 executing on the respective RPA host to determine an identity of a software entity that has created each temporary container file, and thus be able to unambiguously associate each downloaded file with its respective owner/creator.

Figure 12:
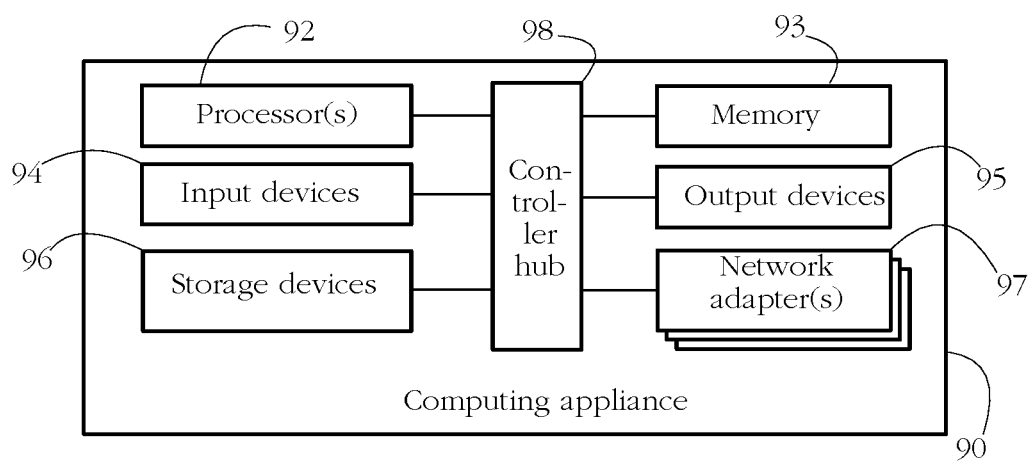
FIG. 12 shows an exemplary hardware configuration of a computer system configured to execute some embodiments of the present invention.

FIG. 12 shows an exemplary hardware configuration of a computing appliance 90 programmed to execute some of the methods described herein. Appliance 90 may represent any of RPA host platforms 20a-e in FIG. 3. The illustrated appliance is a personal computer; other computing devices such as servers, mobile telephones, tablet computers, and wearable computing devices may have slightly different configurations. Processor(s) 92 comprise a physical device (e.g. microprocessor, multi-core integrated circuit formed on a semiconductor substrate) configured to execute computational and/or logical operations with a set of signals and/or data. Such signals or data may be encoded and delivered to processor(s) 92 in the form of processor instructions, e.g., machine code. Processor(s) 92 may include a central processing unit (CPU) and/or an array of graphics processing units (GPU).

Memory unit 93 may comprise volatile computer-readable media (e.g. dynamic random-access memory—DRAM) storing data and/or instructions accessed or generated by processor(s) 22 in the course of carrying out operations. Input devices 94 may include computer keyboards, mice, and microphones, among others, including the respective hardware interfaces and/or adapters allowing a user to introduce data and/or instructions into appliance 90. Output devices 95 may include display devices such as monitors and speakers among others, as well as hardware interfaces/adapters such as graphic cards, enabling the respective computing device to communicate data to a user. In some embodiments, input and output devices 94-95 share a common piece of hardware (e.g., a touch screen). Storage devices 96 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 97 include mechanical, electrical, and signaling circuitry for communicating data over physical links coupled to an electronic communication network (e.g, FIG. 3) and/or to other devices/computer systems. Adapter(s) 97 may be configured to transmit and/or receive data using a variety of communication protocols.

Controller hub 98 generically represents the plurality of system, peripheral, and/or chipset buses, and/or all other circuitry enabling the communication between processor(s) 92 and the rest of the hardware components of appliance 90. For instance, controller hub 98 may comprise a memory controller, an input/output (I/O) controller, and an interrupt controller. Depending on hardware manufacturer, some such controllers may be incorporated into a single integrated circuit, and/or may be integrated with processor(s) 92. In another example, controller hub 98 may comprise a northbridge connecting processor 92 to memory 93, and/or a southbridge connecting processor 92 to devices 94, 95, 96, and 97.

The exemplary systems and methods described above facilitate the design/programming of RPA robots by making such activities more accessible and attractive to developers that lack a formal programming background.

Some robotic activities may comprise downloading a file from a remote location, e.g. a webserver, and processing a content of the respective downloaded file. However, successfully automating a file download activity requires overcoming a few technical hurdles. For instance, the duration of a download is not known a priori; it depends on many factors such as the file size, the current state of the communication network, and the current server load, among others.

Therefore, carrying out the same download operation repeatedly may result in substantially different wait times. Sometimes, the download may fail to initiate and/or to complete, for instance when the respective server is down, when the respective file is unavailable, or when the address of the respective file is incorrect. A further technical difficulty associated with file downloads is that the runtime filename of the downloaded file may not be known/accessible before the respective file has finished downloading. Frequently, the filename is generated dynamically by the server, e.g., to include a timestamp, a character string identifying the requesting entity, etc. Filenames may also differ according to the current geographical location of the requesting entity (e.g., users from Europe and North America may be served different files).

In view of the above, to successfully use the results of a file download activity, an RPA robot needs to automatically determine whether the download operation was successful and to further automatically determine a set of runtime attribute values of the downloaded file (e.g., filename, size, etc.). Configuring a robot to carry out such calculations may require a level of computer programming expertise expected to exceed that of an average person, and therefore may be out of reach for non-technical RPA developers. Some embodiments therefore enable the user to automate a file download activity using a set of built-in visual tools, instead of coding per se.

Some embodiments expose an RPA design interface comprising a dedicated UI control (e.g., a button and/or a menu item) for automating a file download activity. In one example, the RPA design interface comprises an activity menu listing a plurality of available robotic activities to be performed by the RPA robot. The activity menu may include a dedicated file download item, which, when invoked, may cause the RPA design interface to include a file download activity into a current robotic workflow. Some embodiments may further expose a user interface for configuring the respective file download activity, the configuration interface enabling the developer to indicate a trigger event for initiating the respective download, and a destination folder for the downloaded file, among others.

Some embodiments further enable the user to create a label/alias for the downloaded file. In response, the RPA design interface may populate an activity configuration menu with the newly defined alias, thus giving the developer access to the runtime values of various file attributes of the downloaded file (e.g., filename, size, creation timestamp, etc.) by referencing the respective alias, again without having to resort to coding.

In some embodiments, executing the respective file download activity comprises the RPA robot executing the trigger activity to initiate the download (e.g., clicking on a specific hyperlink of a target webpage), and suspending/blocking execution of other activities subsequent to the file download activity until the respective download is complete. To determine whether the file has finished downloading, some embodiments monitor the contents of the destination folder, and use a set of filename heuristics to determine whether the download has started.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to:
   expose an activity menu to a user, the activity menu comprising a plurality of robotic process automation (RPA) activities available for execution by a software robot, the activity menu including a file download item; and
   in response to a user input selecting the file download item, insert a file download activity into a workflow comprising an ordered sequence of RPA activities, the file download activity instructing a software robot to download a file to a destination folder;
   wherein executing the software robot on an RPA host causes the RPA host to:
      in response to initiating a download of the file, suspend execution of another activity of the workflow until the download is complete, the other activity following the file download activity within the workflow; and
      when the download is complete, resume execution of the other activity using a runtime value of a file attribute of the file.

2. The method of claim 1, wherein the file attribute comprises a filename of the file.

3. The method of claim 1, wherein the file attribute comprises an item selected from a group consisting of a filesize of the file, a file creation timestamp of the file, and a filesystem path to the file.

4. The method of claim 1, further comprising employing at least one hardware processor of the computer system, in response to the user input selecting the file download item, to expose an activity configuration user interface enabling the user to specify a trigger event for initiating the file download.

5. The method of claim 1, further comprising employing at least one hardware processor of the computer system, in response to the user input selecting the file download item, to expose an activity configuration user interface enabling the user to specify the destination folder.

6. The method of claim 1, further comprising employing at least one hardware processor of the computer system, in response to the user input selecting the file download item, to:
   expose an activity configuration user interface enabling the user to specify an alias for the file; and
   in response to a user input specifying the alias, expose an activity configuration menu to the user, the activity configuration menu listing options for configuring the other robotic activity of the workflow, the activity configuration menu including the alias.

7. The method of claim 6, further comprising employing at least one hardware processor of the computer system, in response to a user input selecting the alias from the activity configuration menu, to expose a second menu listing a plurality of file attributes including the file attribute.

8. The method of claim 1, comprising employing at least one hardware processor of the computer system to determine whether the download is complete according to a filename heuristic applied to a current content of the destination folder.

9. The method of claim 8, wherein the filename heuristic comprises determining whether a filename of a selected file within the destination folder has a specific extension.

10. A computer system comprising at least one hardware processor configured to:
    expose an activity menu to a user, the activity menu comprising a plurality of robotic process automation (RPA) activities available for execution by a software robot, the activity menu including a file download item; and
    in response to a user input selecting the file download item, insert a file download activity into a workflow comprising an ordered sequence of RPA activities, the file download activity instructing a software robot to download a file to a destination folder;
    wherein executing the software robot on an RPA host causes the RPA host to:
       in response to initiating a download of the file, suspend execution of another activity of the workflow until the download is complete, the other activity following the file download activity within the workflow; and
       when the download is complete, resume execution of the other activity using a runtime value of a file attribute of the file.

11. The computer system of claim 10, wherein the file attribute comprises a filename of the file.

12. The computer system of claim 10, wherein the file attribute comprises an item selected from a group consisting of a filesize of the file, a file creation timestamp of the file, and a filesystem path to the file.

13. The computer system of claim 10, wherein the at least one hardware processor is further configured, in response to the user input selecting the file download item, to expose an activity configuration user interface enabling the user to specify a trigger event for initiating the file download.

14. The computer system of claim 10, wherein the at least one hardware processor is further configured, in response to the user input selecting the file download item, to expose an activity configuration user interface enabling the user to specify the destination folder.

15. The computer system of claim 10, wherein the at least one hardware processor is further configured, in response to the user input selecting the file download item, to:
    expose an activity configuration user interface enabling the user to specify an alias for the file; and
    in response to a user input specifying the alias, expose an activity configuration menu to the user, the activity configuration menu listing options for configuring the other robotic activity of the RPA workflow, the activity configuration menu including the alias.

16. The computer system of claim 15, wherein the at least one hardware processor is further configured, in response to a user input selecting the alias from the activity configuration menu, to expose a second menu listing a plurality of file attributes including the file attribute.

17. The computer system of claim 10, wherein the at least one hardware processor is further configured to determine whether the download is complete according to a set of filename heuristics applied to a current content of the destination folder.

18. The computer system of claim 17, wherein the filename heuristic comprises determining whether a filename of a selected file within the destination folder has a specific extension.

19. The computer system of claim 10, comprising a client computer and a cloud server computer communicatively coupled to the client computer, wherein:
   the client computer is configured to expose the activity menu to the user; and
   the cloud server computer is configured to receive an indicator of the user input from the client computer, and in response, to insert the file download activity into the workflow.

20. A non-transitory computer-readable medium storing instructions which, when executed by at least one hardware processor of a computer system, cause the computer system to:
   expose an activity menu to a user, the activity menu comprising a plurality of robotic process automation (RPA) activities available for execution by a software robot, the activity menu including a file download item; and
   in response to a user input selecting the file download item, insert a file download activity into a workflow comprising an ordered sequence of RPA activities, the file download activity instructing a software robot to download a file to a destination folder;
   wherein executing the software robot on an RPA host causes the RPA host to:
      in response to initiating a download of the file, suspend execution of another activity of the workflow until the download is complete, the other activity following the file download activity within the workflow; and
      when the download is complete, resume execution of the other activity using a runtime value of a file attribute of the file.

* * * * *